000# UNITED STATES PATENT OFFICE.

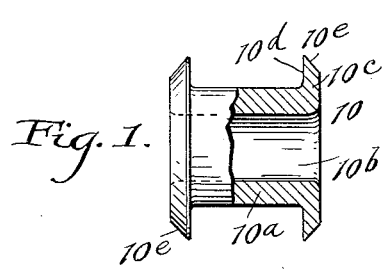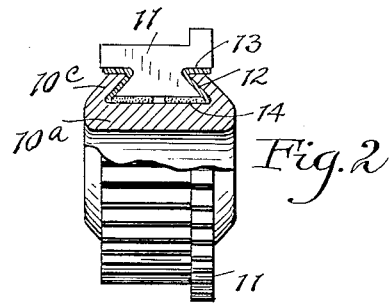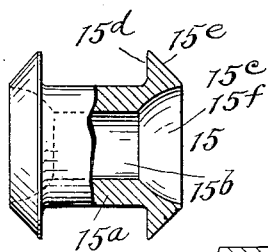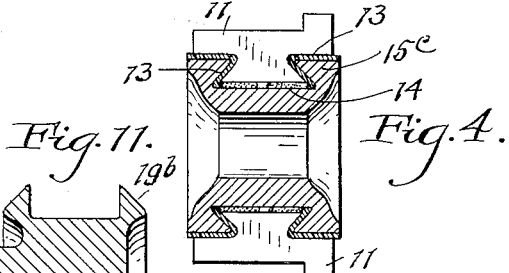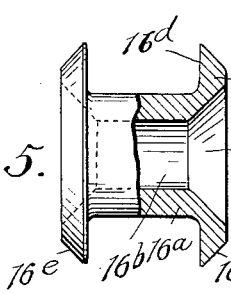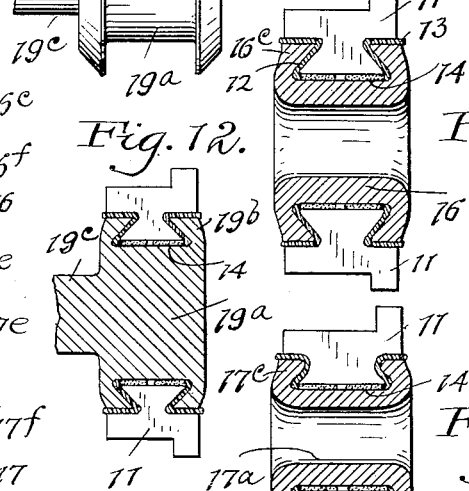

CHARLES A. VAN DUSEN, OF TOLEDO, OHIO, ASSIGNOR, BY MESNE ASSIGNMENTS, TO THE TOLEDO STANDARD COMMUTATOR CO., OF TOLEDO, OHIO, A CORPORATION OF OHIO.

SPOOL OR HOLDER FOR COMMUTATORS.

1,354,007.

Specification of Letters Patent. Patented Sept. 28, 1920.

Application filed February 24, 1919. Serial No. 278,970.

*To all whom it may concern:*

Be it known that I, CHARLES A. VAN DUSEN, a citizen of the United States, residing at Toledo, in the county of Lucas and State of Ohio, have invented a certain new and useful Improvement in Spools or Holders for Commutators, of which the following is a full, clear, and exact description.

This invention relates to a new article of manufacture consisting of a one-piece spool or holder for the segments and insulation of a cylindrical commutator.

In an application, Serial No. 200,653, filed November 7, 1917, and a second application, Serial No. 276,461, filed Feb. 12, 1919, filed as a continuation of the first-named, patented Jan. 27, 1920, No. 1,329,277, I have disclosed and claimed certain improvements in commutators and process of producing the same, the basis of which is a spool or holder formed in one piece and provided with a barrel or cylindrical body about which the segments are assembled, and provided at its ends with flanges, both integral with the body of the holder and adapted to be swaged inwardly into tight clamping engagement with insulated bearing surfaces of the segments so as to securely hold the latter against displacement in any direction. The swaging of the flanges is preferably accomplished in a closing die or press having dies suitably shaped to drive the flanges to the desired clamping position onto the insulation covering the surfaces formed by the tangs, and generally, so as to completely fill the annular grooves in the assembled segments formed by the notches provided in the ends thereof, in which event the flanges are swaged not only inwardly so as to bear solidly against the insulation overlying the tangs, but also firmly against the insulation lining the outer walls of the grooves formed by the overhanging portions of the segments.

Thus there is formed an exceedingly tight unit, especially as the segments are, during the swaging operations, clamped down solidly onto a hard insulating medium which I prefer to provide between the barrel or body of the holder and the inner edges of the segments, this latter permitting an exceedingly severe clamping pressure to be exerted in the closing operations.

The subject matter of this application, as before stated, is the spool or holder utilized in forming the commutators above mentioned, and the invention has for its chief object to provide a device or article of manufacture which I believe to be wholly novel in this art, and formed in one piece with integral flanges or segment clamping portions so formed and shaped that they may be swaged inwardly to the desired clamping position, and thus perform in the most effective manner the clamping and retaining functions. Still further the invention aims to provide a device of the character stated, which can be produced rapidly, as by means of an automatic screw machine, and which materially reduces the cost of the finished commutator.

The invention may be briefly summarized as consisting in certain novel details of construction which will be described in the specification and set forth in the appended claims.

In the accompanying sheets of drawings wherein I have shown several embodiments of my invention, Figures 1, 3, 5, 7, 9 and 11 are views partly in side elevation and partly in section showing six different forms of spools or holders as they are produced ready for use to form slightly different forms of commutators; Figs. 2, 4, 6, 8, 10 and 12 are sectional views through the corresponding completed commutators made from the spools.

The spool 10 shown in Fig. 1 is provided with a barrel or cylindrical body $10^a$, through which extends a shaft opening $10^b$, the barrel being provided at its ends with integral flanges $10^c$ which as here shown, extend outwardly at right angles to the longitudinal axis of the spool. The flanges are provided with parallel inner faces $10^d$ which are a sufficient distance apart to permit the segments and mica or other insulation to be assembled about the barrel, and in this case the outer edges $10^e$ of the flanges, *i. e.*, the portions between the inner and outer faces, are inclined or tapered inwardly toward the axis, or away from the inner faces $10^d$, the taper in this instance being at an angle of about 45° to the faces $10^d$, and therefore at an angle of 45° to the longitudinal axis of the spool. The angle between the inner face of the flange and the outer tapered edge or face $10^e$ has a definite relation to the angle between the beveled edge of the tang and the edge of the portion overhanging the tang.

With the spool 10 there is produced in the closing die a finished commutator such as shown in Fig. 2, both end flanges being swaged inwardly so that the inner, previously parallel clamping faces $10^d$ now are parallel to the beveled surfaces of the tangs of the segments 11, and bear solidly onto insulation 12 consisting preferably of mica overlying the beveled surfaces formed by the tangs of the segments, and the edges $10^e$ which were previously at an angle of 45° to the longitudinal axis of the spool now are substantially parallel to the surfaces formed by the portions of the segments overhanging the tangs and bear firmly against the mica insulation 13 provided inside the overhanging portions.

The swaging of these flanges is preferably performed in several closing operations wherein radial pressure is exerted on the segments themselves, and severe axial clamping or swaging pressure is exerted on the flanges of the spool, which drives them not only inwardly against the insulation covering the tangs, but causes the metal to flow outwardly so as to fill the end grooves of the assembly and the outer faces or edges $10^e$ to bear solidly against the insulation 13. In addition the segments are firmly clamped or held by the flanges down onto a hard layer of insulation 14 provided between the barrel and the inner edges of the segments, this insulation being preferably provided around the barrel in the form of a plastic strip and being converted to its hard substantially unyielding state by a baking operation before the final closing operation, or before the severest pressure is applied, which drives the flanges to their final positions described.

The spool 10 and those subsequently to be described are preferably formed of steel of such quality or hardness as will enable the flanges to be readily swaged to clamping position.

In Fig. 3 I have shown a spool, here designated 15, having a barrel $15^a$ with a shaft opening $15^b$ as before, and provided with peculiar shaped flanges $15^c$. These flanges have inner substantially parallel clamping faces $15^d$ which are designed to be clamped down onto the insulation covering the beveled surfaces formed by the tangs as in the first instance, and they are provided with tapered outer faces $15^e$ which taper away from the faces $15^d$, and inwardly toward the axis at an angle of about 45° with respect to the faces $15^d$. In addition the ends of the spool are provided with partly conical and partly spherical recesses $15^f$ which extend inwardly beyond the planes of the faces $15^d$, causing the flanges to be thinner near the barrel than at their periphery, and giving the flanges a shape such that they will bend at the right points and assume the desired positions when the assembly is subjected to a closing operation.

With this spool there is produced a commutator such as shown in Fig. 4, with the faces $15^d$ swaged inwardly over the insulation covering the tangs, and with the outer faces $15^e$ swaged outwardly and clamped against the insulation within the overhanging portions of the segments, and the annular grooves in the ends of the assembled segments completely filled by the flanges.

By reason of the fact that the end recesses $15^f$ extend inwardly beyond the parallel faces $15^d$, the flanges bend at different points than do the flanges of Fig. 1, causing a substantial shortening of the spool in the closing operations. This is also characteristic of the spools shown in Figs. 5 and 7.

The spool 16 shown in Fig. 5, is provided as in the other instances, with a barrel $16^a$, shaft opening $16^b$, and integral flanges $16^c$, with inner clamping faces $16^d$ and outer tapered clamping faces $16^e$. The spool has end recesses $16^f$ which extend inwardly beyond the faces $16^d$, and in this instance are conical rather than partly conical and partly spherical as in Fig. 3. With this spool there is produced a commutator substantially as shown in Fig. 6.

In Fig. 7 is shown a spool 17 having some of the characteristics of the spools of Figs. 3 and 5, but differing therefrom in the shape of the flanges. In this instance the barrel is designated $17^a$, shaft opening $17^b$, and the flanges $17^c$. The inner parallel faces $17^d$ which are designed to be swaged over the beveled tangs gradually merge into the inclined faces $17^e$ which are designed to be swaged outwardly against the overhanging portions of the segments, the intersection between the two faces being rounded rather than sharp or abrupt as in the preceding instances. The end recesses $17^f$ extend inwardly beyond the parallel faces $17^d$ and may be either conical as in Fig. 5, or both conical and spherical as in Fig. 3, depending upon the desired shape and to some extent on the size of the completed commutator. In Fig. 8 is shown a commutator formed with the spool of Fig. 7.

The spools of Figs. 1, 3, 5 and 7 are preferably formed on an automatic screw machine though they may be otherwise formed as by a molding process, and that shown in Fig. 9 may be formed in a similar manner, or by a stamping or spinning process, in which event a suitable length of drawn tube is preferably employed. This spool which is designated 18, has a barrel $18^a$ with a shaft opening $18^b$ and it has integral flanges $18^c$ which first extend radially outward from the barrel forming the inner parallel clamping faces 18$^d$, and then extend in an axial direction, in this instance, at right angles to the faces 18$^d$, forming the outer faces 18$^e$ which are designed to be clamped against the insulated overhanging walls of the segments. This forms at each end of the spool an annular recess 18$^f$.

When this spool is utilized to form the commutator of Fig. 10, while the angle of the faces 18$^d$ with respect to the axis is changed as in all the prior instances, the outer flanged portions forming the faces 18$^e$ remain parallel to their original position, in which event the angle between the faces 18$^d$ and 18$^e$ is changed from substantially 90° to substantially 45°, or to whatever angle the beveled edges of the tangs make with respect to the overhanging portions which may be more or less than 45°, but generally the latter.

The several holders above described, are all formed with central shaft openings so that the holders may be slipped onto the armature shafts. It is not essential, however, to my invention, especially in its broadest aspects, that the holder be provided with such a shaft opening, and the word "barrel" where used in the specification and in the claims (except those specifically limited to a holder with a shaft opening) is employed in a broad sense inclusive of a holder having a solid core or body, or one which is made hollow by the provision of a shaft opening extending therethrough. In Fig. 11, for example, I have shown a one-piece holder 19 with a solid cylindrical body 19$^a$, having suitably formed integral flanges 19$^b$. If the holder is formed with a solid core or body portion, it may be bored out to form a shaft opening after the completion of the commutator, or it may be formed integral with a shaft or shaft extension 19$^c$, in which event the latter may be the armature shaft itself, or could be utilized to secure the commutator to the armature shaft or armature. The flanges 19$^b$ of Fig. 11, may have any suitable shape such as illustrated in any of the preceding figures.

With a spool or holder having integral clamping flanges at both ends, and designed to be swaged inwardly to solidly clamp the segments against displacement, it will be apparent that an exceedingly tight or solid commutator can be produced, capable of successfully withstanding the high centrifugal stresses to which a commutator in practice is subjected. In addition inasmuch as the number of parts are reduced, there is, of course, less likelihood of the structure becoming loose; also less likelihood of short circuiting due to displacement, slipping or rupturing of insulation.

Furthermore the cost of producing a commutator with the one-piece holder such as described, is reduced for many reasons, among which may be mentioned the fact that the holder can be more cheaply and quickly formed than can the parts of a two or three piece holder; less turning is required if it is formed in a screw machine or lathe; the one-piece holder requires less steel than a holder of two or more pieces; less expensive mica insulation can be used between the flanges of the holder and the ends of the segments since I can employ insulation of ring and tubular form which is much cheaper than the pressed mica forms used with the old types of commutators; the amount of finished product which must be scrapped by reason of defective insulation is much reduced; the over-all length of the commutator with a one-piece holder can be made smaller than in a commutator of the old type having an equal width of brush surface, and there is a great saving of copper due to the fact that it is unnecessary to cut the overhanging portions of the segments on a taper in order to have the flanges completely fill the end grooves of the assembled segments as has been the case with the old method in order to permit the introduction of the end rings into the annular grooves or channels.

While I have shown several embodiments of my invention, I do not wish to be confined to the precise details shown, as other modifications or changes may be made in the shape or form of the holder, and particularly in the shape of the integral segment clamping portions, and I therefore aim in my claims to cover all modifications which do not involve a departure from the spirit and scope of my invention in its broadest aspects.

Having described my invention, I claim:

1. As an article of manufacture, a one-piece holder for the segments of a cylindrical commutator comprising a cylindrical body provided at its ends with integral segment clamping flanges having inner clamping faces normally a sufficient distance apart to permit the segments to be assembled around the body and adapted to be swaged inwardly over the segment tangs by pressure applied axially to opposite ends of the holder.

2. As an article of manufacture, a one-piece holder for cylindrical commutators comprising a body around which the segments are adapted to be assembled and having at its ends integral segment clamping flanges spaced a sufficient distance apart to permit the segments to be assembled around the body and adapted to be swaged inwardly over and into engagement with contiguous angularly disposed insulated bearing surfaces of the segments.

3. As an article of manufacture, a one-piece holder for cylindrical commutators comprising a body about which the segments are adapted to be assembled and provided with spaced integral annular segment clamping flanges adapted to be swaged inwardly into annular grooves formed in the ends of the assembled segments, each flange having an inner clamping face and an outer clamping face at an angle thereto.

4. As an article of manufacture, a one-piece holder for cylindrical commutators comprising a body about which the segments are adapted to be assembled and provided with spaced integral annular segment clamping flanges, said flanges having inner substantially parallel clamping faces substantially normal to the axis of the holder, and outer clamping faces at an angle thereto.

5. As an article of manufacture, a one-piece holder for the segments of a cylindrical commutator comprising a body about which the segments are adapted to be assembled and provided with two integral segment clamping flanges, said flanges having substantially parallel inner clamping surfaces and having outer clamping surfaces which taper away from the first-named surfaces toward the longitudinal axis of the holder.

6. As an article of manufacture, a one-piece holder for cylindrical commutators comprising a cylindrical barrel provided at its ends with annular segment clamping flanges adapted to be swaged into engagement with insulated clamping surfaces of the segments, the barrel having a shaft opening, and the ends of the holder having recesses continuous with, but at least in part of greater diameter than the shaft opening.

7. As an article of manufacture, a one-piece holder for cylindrical commutators comprising a barrel having at its ends integral annular segment clamping flanges adapted to be swaged inwardly to clamping engagement with insulated bearing surfaces of the segments, said barrel having a shaft opening, the ends of which are enlarged to form recesses within the flanges.

8. As an article of manufacture, a holder for cylindrical commutators comprising a barrel provided at its ends with integral segment clamping flanges having inner clamping faces adapted in the completed commutator to extend over the segment tangs, the barrel having a shaft opening, and the ends of the holder having recesses which at their outer ends are larger than said shaft opening and extend inwardly beyond said clamping faces.

9. As an article of manufacture, a holder for cylindrical commutators comprising a body having a pair of spaced annular integral segment clamping flanges, and the ends of the holder having axial recesses which are of gradually increasing diameter from their inner ends outward.

10. As an article of manufacture, a holder for cylindrical commutators comprising a barrel having at its ends integral segment clamping flanges, the latter having inner, substantially parallel clamping surfaces substantially normal to the axis of the holder, and having outer clamping surfaces tapering toward the spool axis and away from said first-named clamping surfaces, the barrel having a shaft opening and the ends of the holder having recesses which extend inwardly to and constitute continuations of the shaft opening.

11. As an article of manufacture, a holder for the segments and insulation of cylindrical commutators comprising a body having a pair of spaced integral flanges adapted to be swaged inward over projecting portions of commutator segments assembled around the body, each flange being thinner near its junction with said body than toward its periphery.

In testimony whereof, I hereunto affix my signature.

CHARLES A. VAN DUSEN.